United States Patent
Dienst

(10) Patent No.: US 9,674,998 B2
(45) Date of Patent: Jun. 13, 2017

(54) VERTICALLY OFFSET GAUGE WHEELS AND ASSOCIATED CONTROL ROCKER

(71) Applicant: CNH Industrial America LLC, New Holland, PA (US)

(72) Inventor: Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/755,919

(22) Filed: Jun. 30, 2015

(65) Prior Publication Data
US 2017/0000003 A1   Jan. 5, 2017

(51) Int. Cl.
| | |
|---|---|
| *A01C 7/20* | (2006.01) |
| *A01B 49/06* | (2006.01) |
| *A01B 5/00* | (2006.01) |
| *A01B 49/02* | (2006.01) |
| *A01C 5/06* | (2006.01) |
| *A01C 7/16* | (2006.01) |

(52) U.S. Cl.
CPC ............... *A01B 49/06* (2013.01); *A01B 5/00* (2013.01); *A01B 49/027* (2013.01); *A01C 5/062* (2013.01); *A01C 5/064* (2013.01); *A01C 5/068* (2013.01); *A01C 7/163* (2013.01); *A01C 7/203* (2013.01)

(58) Field of Classification Search
CPC combination set(s) only.
See application file for complete search history.

(56) References Cited

U.S. PATENT DOCUMENTS

| | | | |
|---|---|---|---|
| 4,104,975 A | | 8/1978 | Ingram et al. |
| 4,117,787 A | | 10/1978 | Pavan |
| 4,413,685 A | * | 11/1983 | Gremelspacher ...... A01B 63/22 111/14 |
| 5,081,942 A | * | 1/1992 | Clark ................... A01B 63/166 111/136 |
| 5,511,498 A | | 4/1996 | Lohrentz et al. |
| 5,762,146 A | | 6/1998 | Andrews |
| 6,148,747 A | * | 11/2000 | Deckler .................. A01C 5/06 111/137 |
| 7,191,715 B2 | | 3/2007 | Wendte et al. |
| 7,240,625 B2 | | 7/2007 | Wendte et al. |
| 7,240,626 B2 | | 7/2007 | Wendte et al. |
| 7,360,495 B1 | * | 4/2008 | Martin .................. A01C 7/203 111/164 |
| 7,631,607 B2 | | 12/2009 | Vandersnick |
| 8,078,367 B2 | * | 12/2011 | Sauder ................ A01B 79/005 111/200 |
| 8,469,114 B1 | | 6/2013 | Borkgren |
| 8,479,669 B2 | | 7/2013 | Shoup |
| 8,635,962 B2 | | 1/2014 | Schilling |

(Continued)

FOREIGN PATENT DOCUMENTS

| | | |
|---|---|---|
| DE | 36 15 819 A1 | 11/1987 |
| FR | 1 482 681 | 5/1967 |
| WO | 2014/153157 A1 | 9/2014 |

*Primary Examiner* — Alicia Torres
(74) *Attorney, Agent, or Firm* — Rebecca L. Henkel; Rickard K. DeMille

(57) ABSTRACT

A depth adjustment for an agricultural seed planting implement has a depth control assembly of side by side gauge wheels pivotally mounted to a frame with leading equal length arms in a staggered relation. A settable lever acts on the arms through a control rocker having arms with the same staggered relation to control soil flow.

12 Claims, 4 Drawing Sheets

(56) References Cited

U.S. PATENT DOCUMENTS

| | | | |
|---|---|---|---|
| 2008/0011208 A1* | 1/2008 | Martin | A01C 5/066 |
| | | | 111/167 |
| 2008/0083357 A1* | 4/2008 | Martin | A01B 29/02 |
| | | | 111/139 |
| 2013/0000536 A1* | 1/2013 | Schilling | A01C 7/203 |
| | | | 111/163 |
| 2014/0090585 A1 | 4/2014 | Sauder et al. | |
| 2014/0191857 A1 | 7/2014 | Sauder et al. | |

\* cited by examiner

VERTICALLY OFFSET GAUGE WHEELS AND ASSOCIATED CONTROL ROCKER

BACKGROUND OF THE INVENTION

1. Field of the Invention

The present invention generally relates to agricultural seed planting implements and to the furrow opening assemblies thereon.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

It is desirable that seeds should be planted at precisely controlled and consistent depths and the soil flow should be consistent on both sides of the trench created and covered by the planting unit.

To control planting depth, it is known to provide gauge wheels that travel on the surface of the field to control the depth to which the ground penetrating assembly can run, the positions of the gauge wheels being adjustable so that the depth of the seed trench can be controlled within fractions of an inch. The gauge wheels also serve the function of controlling the soil exiting the seed trench. This becomes more important as the speed of the planting unit increases over the soil. Without a uniform management of force applied by the gauge wheels, soil can be unevenly distributed.

What is needed in the art is a planting implement that provides greater control over the flow of soil that ground penetrating components displace during a planting operation, while trying to maintain equal soil pressure on each side of the row unit.

SUMMARY OF THE INVENTION

The present invention provides a seed planting implement with an improved soil flow during the seed planting operation.

In one form thereof, the invention is directed to an agricultural seed planting implement having a frame moveable in an up and down direction relative to soil over which the frame traverses and a seed trench opening assembly mounted to the frame. A pair of gauge wheels is provided as well as equal length arms pivotally mounted to the frame for journaling the gauge wheels, the position of the gauge wheels setting the depth of the seed trench. A depth control device includes a lever settable in a plurality of discrete positions and a rocker pivotally connected to the settable lever for abutting the arms to set the depth of the seed trench. The arms are mounted to the frame in staggered locations and the rocker has arms staggered to match the staggered position of the arms.

In another form thereof, the invention is directed to an agricultural seed planting implement having a toolbar moveable across a soil area, a frame and links connecting the frame to said toolbar so that the frame is moveable in an up and down direction relative to soil area over which the toolbar traverses. A seed trench opening assembly is mounted to the frame. A pair of gauge wheels is provided as well as equal length arms pivotally mounted to the frame for journaling the gauge wheels, the position of the gauge wheels setting the depth of the seed trench. A depth control device includes a lever settable in a plurality of discrete positions and a rocker pivotally connected to the settable lever for abutting the arms to set the depth of the seed trench. The arms are mounted to the frame in staggered locations and the rocker has arms staggered to match the staggered position of the arms.

An advantage of the depth adjustment for ground penetrating equipment disclosed herein is that the soil flow can be controlled uniformly and accurately.

Another advantage of the depth adjustment for ground penetrating equipment disclosed herein is that the load between adjacent gauge wheels is more effectively balanced.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
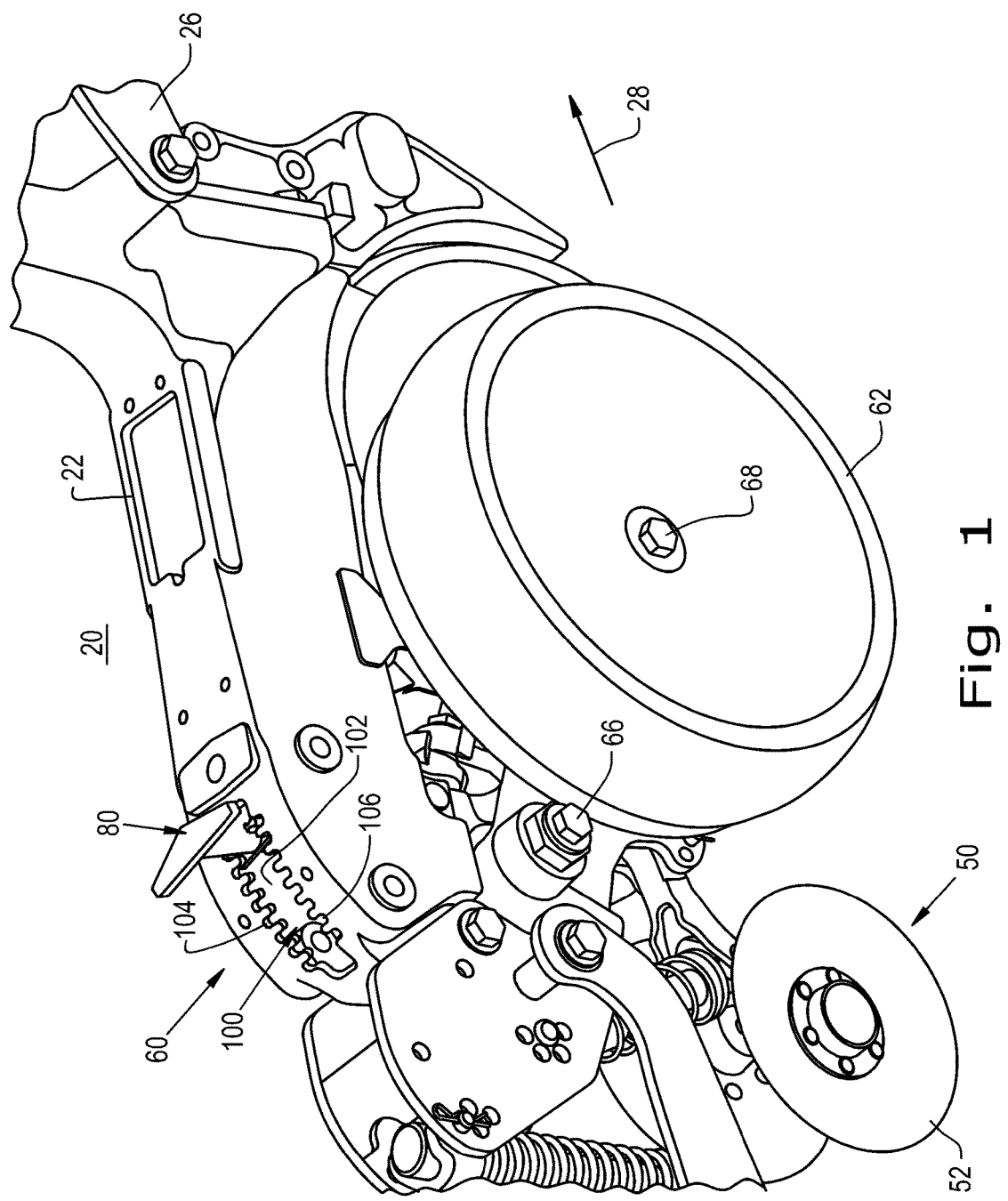
FIG. 1 is a perspective view of a seed planting unit incorporated in a seed planting implement.

Referring now to the drawings more specifically and to FIG. 1 in particular, a seed planting unit 20 is shown. Seed planting unit 20 is part of a seed planting implement having a frame that includes a tow bar assembly, a tow bar and a connection assembly at the longitudinally forward end thereof configured for mating with a corresponding hitch of a tractor or other work vehicle (all of which are not shown) for pulling the seed planting implement through a field. A laterally extending toolbar 18 (shown in dashed lines in FIG. 2) is generally transverse to the tow bar and thereby generally transverse to the direction 28 the implement is towed during planting operations. A plurality of seed planting units (or row units) 20 are connected to toolbar 18 in a side by side relationship, each of the seed planting units (row units) being substantially identical to the others. In the exemplary embodiment shown, seed planting implement 10 may include sixteen seed planting units 20, only one of which is identified with reference numbers; however, it should be understood that more or fewer seed planting units can be provided on a particular seed planting implement.

Figure 2:
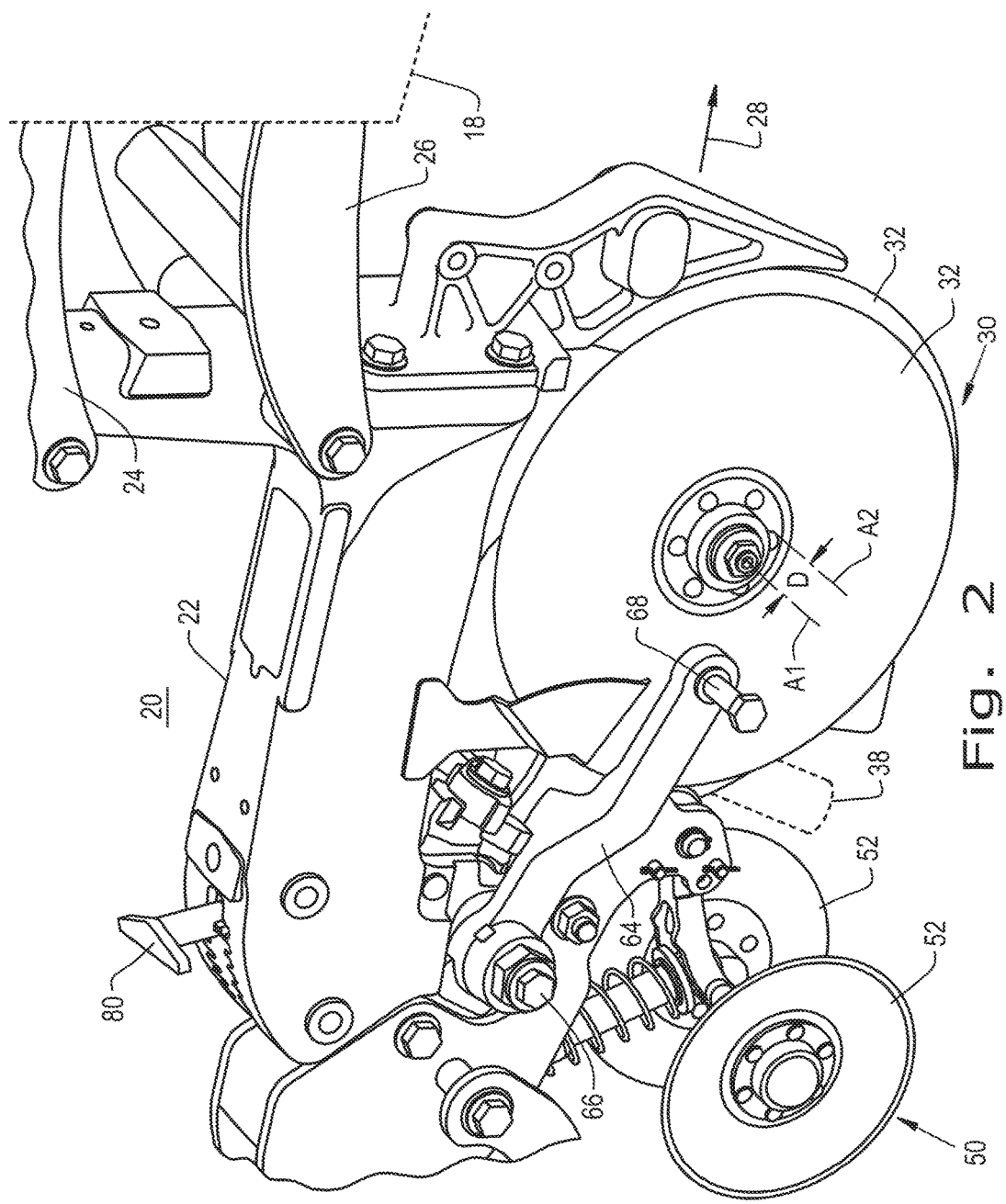
FIG. 2 is another perspective view of the seed planting unit, showing the unit from an angle different from the angle shown in the perspective view of FIG. 2.

Referring now primarily to FIGS. 1 and 2, each seed planting unit 20 includes a frame 22 that is connected to toolbar 18 by upper arms 24 and lower arms 26, each arm 24, 26 being connected to frame 22 and to toolbar 18. Accordingly, each seed planting unit 20 extends rearward from toolbar 18 to plant a row of seeds as the seed planting implement is towed across a field in the direction 28. The individual planting units 20 are spaced along toolbar 18 to provide planted seed rows of a desired spacing. During a planting operation, forward movement of the seed planting implement causes each seed planting unit 20 to form a seed trench, deposit equally spaced seeds in the seed trench and close the seed trench over the deposited seeds.

Each seed planting unit 20 includes a ground penetrating or seed trench opening assembly 30 having a pair of forwardly and downwardly angled opening discs 32 that converge forwardly and downwardly to open a furrow or seed trench as the seed planting implement moves forward. As particularly seen in FIG. 2, the opening disks 32 are mounted on axes A1 and A2, in staggered relation so that their axes are spaced by D1.

A seed metering system receives seeds from a seed hopper and provides individual seeds at a controlled rate to a seed tube 38 (shown in dashed lines) for deposit in the bottom of the seed trench formed. The details of the seed metering system are not shown to enable a clearer understanding of the present invention.

A seed trench closing mechanism 50 (FIG. 1) at the trailing end of each seed planting unit 20 closes the seed trench after the seeds have been deposited in the seed trench. Seed trench closing mechanism 50 includes a pair of closing disks 52 (FIG. 2) that operate on opposite sides of the seed trench to move soil back into the seed trench and over the seeds deposited in the bottom of the seed trench. A trailing press wheel (not shown) travels along the top of the closed seed trench and firms the soil replaced in the seed trench.

Figure 3:
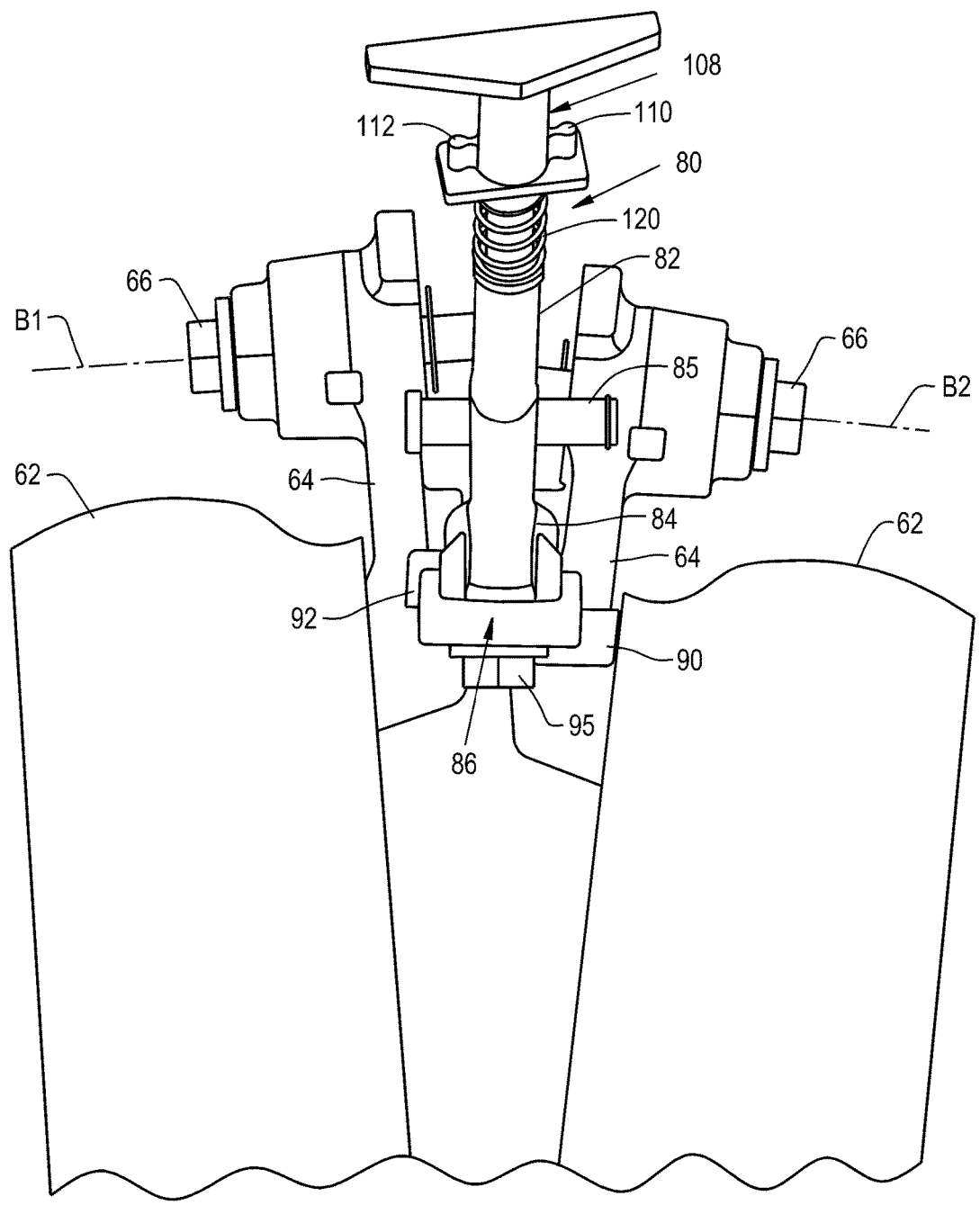
FIG. 3 is a fragmentary top view of the seed planting unit illustrating inner components used for depth adjustment; and, FIG. 4 is a perspective view of a component of the seed planting unit.

The depth to which opening discs 32 are allowed to penetrate the ground is controlled by a depth control assembly 60 that includes a pair of gauge wheels 62, gauge wheel arms 64 and a depth adjuster and linkage assembly 80, shown in detail in FIG. 3. One of the gauge wheels 62 is provided adjacent each opening disc 32. Each gauge wheel 62 is rotatably mounted on one of the gauge wheel arms 64 by a wheel retention shaft 68, which is particularly illustrated in FIG. 2 where the near side gauge wheel 62 has been removed. The gauge wheel arms 64 are of equal length for production purposes and are pivotally connected at a pivotal attachment 66 to seed planting unit frame 22. Pivoting gauge wheel arm 64 about pivotal attachment 66 to frame 22 changes the relative height position of gauge wheel 62. It should be noted that the gauge wheel arms 64 extend forward in the direction of movement 28, in contrast to typical trailing gauge wheel arms. This permits a compact arrangement of the trench opening and closing components.

As shown particularly in FIG. 3, the pivoted position to which each gauge wheel arm 64 is placed is controlled by depth adjuster and linkage assembly 80 having a control lever 82, a depth control arm 84 and a control rocker 86, also referred to as a wobble bracket. Control lever 82 adjusts a pivotal position for depth control arm 84 and thereby the position of control rocker 86, with control rocker 86 engaging gauge wheel arms 64. Raising gauge wheels 62 allows opening discs 32 to penetrate deeper into the ground, and lowering gauge wheels 62 limits the depth to which discs 32 can penetrate into the ground.

Figure 4:
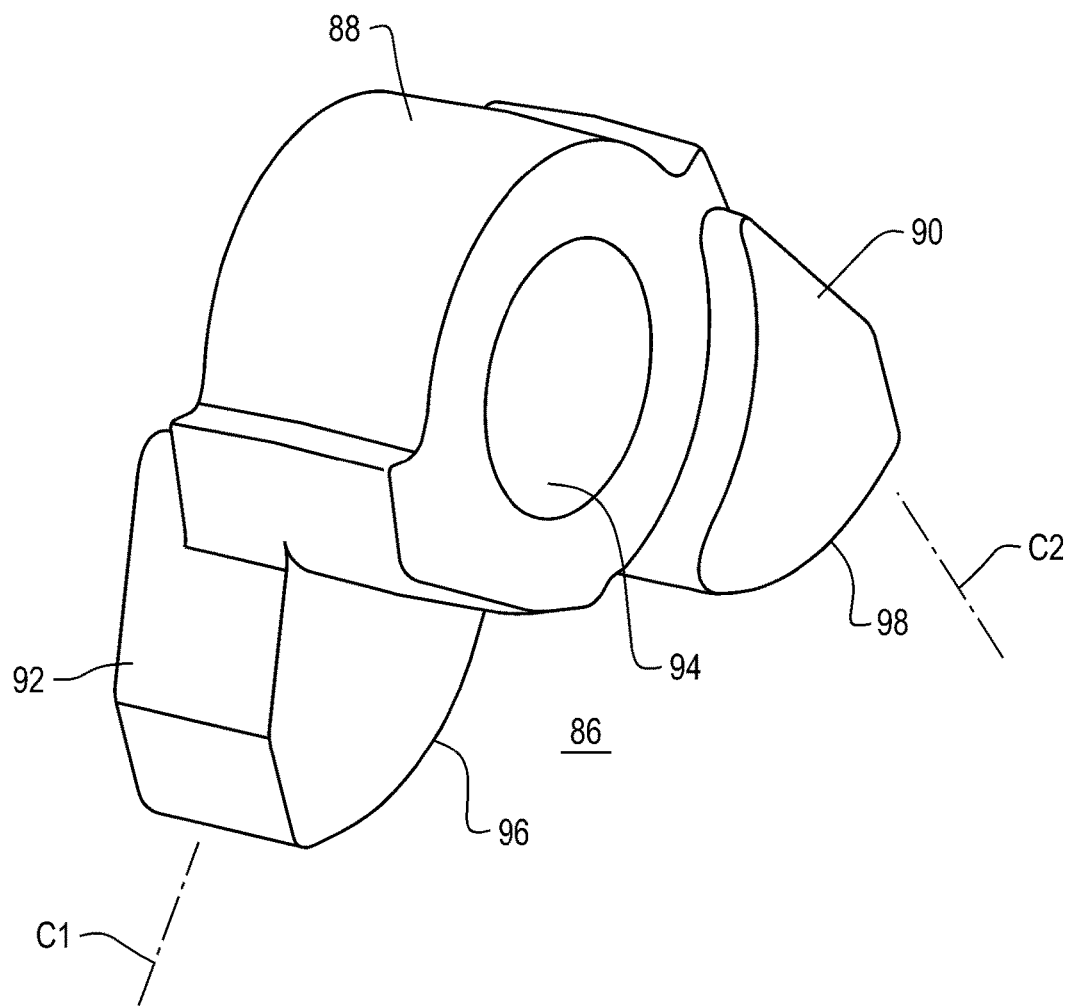

Referring now primarily to FIG. 3 and FIG. 4, depth adjuster and linkage assembly 80 includes the control lever 82 and depth control arm 84 extending therefrom with a pivotal connection through a pin 85 at the junction between the two to seed planting unit frame 22. An outer end of control lever 82 extends through a depth adjustment register 100 (see FIG. 1). Depth adjustment register 100 defines a slot 102 with a first row of notches 104 along one side of slot 102 and a second row of notches 106 along an opposite side of slot 102. Opposed pairs of notches including one of the notches 104 and one of the notches 106 define securing locations for securing the position of control lever 82 after adjustment thereof.

A handle 108 is provided on the outer end of control lever 82 and includes laterally projecting position holding pegs 110, 112 for engaging notches 104, 106 of register 100. The pairs of notches including one of the notches 104 and one of the notches 106 secure the position of pivot arm 90 by receiving and engaging pegs 110, 112. Handle 108 is mounted on a spring 120, and can be depressed relative to control lever 82 such that pegs 110, 112 disengage notches 104, 106 by sliding inwardly through the notches so that handle 108 can be moved fore and aft in slot 102 to align pegs 110, 112 with different pairs of notches 104, 106. As handle 108 rebounds outwardly, pegs 110, 112 slide into the pair of notches 104, 106 with which the pegs are aligned. Movement of handle 108 fore and aft pivots depth control arm 85 about the pivot pin 85, to alter the position of rocker 86, which in turn controls the positions of gauge wheel arms 64 and thereby the allowable height of gauge wheels 62.

Referring to FIG. 3, the rocker 86 is preferably formed from a unitary piece having a base 88 with arms 90 and 92 and a central bore 94 that receives a screw 95 providing a pivotal connection to depth control arm 84. Arms 90 and 92 have curved contact surfaces 98 and 96, respectively to provide a uniform contact with the respective gauge wheel arm 64.

With reference to FIGS. 2, 3 and 4, the axes A1, A2 of the trench opening disks 32 are offset by distance D1. The axes B1, B2 of the gauge wheels 62 are offset by an equal distance, as seen in FIG. 3. Furthermore, centerlines C1 and C2 of the arms 90, 92 are offset by the same distance as shown in FIG. 4. By setting the offset of the arms 90 and 92 of the control rocker 96 to match the offset of the gauge wheels 62, an equal moment arm is established between depth control arm 84 and the gauge wheel arms 64. As a result, equal force is transmitted between gauge wheels 62 through control rocker 86 to manage the soil flow between the sides of the trench created by the trench opening assembly 30. This benefit becomes more important as planting speeds increase and seed planting units are made more compact by utilizing gauge wheels that lead their support arm pivotal connection.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural seed planting implement, comprising:
   a frame moveable in an up and down direction relative to soil area over which the frame traverses;

a seed trench opening assembly mounted to said frame;

a pair of gauge wheels, each gauge wheel having an axis, and wherein the axes of the gauge wheels are offset by a first distance in a vertical direction;

equal length gauge wheel arms pivotally mounted to said frame for journaling said gauge wheels, the position of the gauge wheels setting the depth of the seed trench, wherein each gauge wheel arm is defined by a center line extending through a center of the respective gauge wheel arm in a horizontal direction substantially orthogonal to the vertical direction, and wherein the center lines of the gauge wheel arms are offset by the first distance in the vertical direction;

a depth control device including a control lever settable in a plurality of discrete positions and a control rocker pivotally connected to said control lever for abutting said gauge wheel arms to set the depth of said seed trench; and, wherein said gauge wheel arms are mounted to said frame in staggered locations and said control rocker has arms staggered to matched the staggered locations of the gauge wheel arms.

2. The agricultural seed planting implement of claim 1, wherein the pivotal connection for said gauge wheel arms is behind the gauge wheels as the agricultural implement traverses a field.

3. The agricultural seed planting implement of claim 1, wherein said rocker is a unitary piece.

4. The agricultural seed planting implement of claim 1, wherein said control lever is pivotally connected to said frame and a depth control arm extending therefrom and pivotally connected to said control rocker.

5. The agricultural implement of claim 4, wherein said frame has a slot and plurality of notches and said control lever has a handle selectively engagable in said slots for setting the position of the control rocker.

6. The agricultural seed planting implement of claim 1, wherein said seed trench opening assembly comprises disks positioned side-by-side and mounted on said frame, said opening disks having staggered axes relative to one another.

7. The agricultural seed planting implement of claim 6, further comprising closing disks positioned behind said opening disk and gauge wheels relative to the movement of the implement over the soil.

8. The agricultural seed planting implement of claim 7, further comprising a seed tube positioned between said opening disks and closing disks for depositing seeds in the trough there created.

9. An agricultural seed planting implement, comprising:

a toolbar moveable across a soil area;

a frame;

links connecting said frame to said toolbar so that said frame is moveable in an up and down direction relative to soil area over which the toolbar traverses;

a seed trench opening assembly mounted to said frame;

a pair of gauge wheels, each gauge wheel having an axis, and wherein the axes of the gauge wheels are offset by a first distance in a vertical direction;

equal length gauge wheel arms pivotally mounted to said frame for journaling said gauge wheels, the position of the gauge wheels setting the depth of the seed trench, wherein each gauge wheel arm is defined by a center line extending through a center of the respective gauge wheel arm in a horizontal direction substantially orthogonal to the vertical direction, and wherein the center lines of the gauge wheel arms are offset by the first distance in the vertical direction;

a depth control device including a control lever settable in a plurality of discrete positions and a control rocker pivotally connected to said control lever for abutting said gauge wheel arms to set the depth of said seed trench; and, wherein said arms are mounted to said frame in staggered locations and said control rocker has arms staggered to matched the staggered position of the gauge wheel arms.

10. The agricultural seed planting implement of claim 9, wherein said seed trench opening assembly comprises disks positioned side-by-side and mounted on said frame, said opening disks having staggered axes relative to one another.

11. The agricultural seed planting implement of claim 10, further comprising closing disks positioned behind said opening disk and gauge wheels relative to the movement of the implement over the soil.

12. The agricultural seed planting implement of claim 11, further comprising a seed tube positioned between said opening disks and closing disks for depositing seeds in the trough there created.

\* \* \* \* \*